(12) United States Patent
Kim et al.

(10) Patent No.: US 7,790,109 B2
(45) Date of Patent: Sep. 7, 2010

(54) MICRO-FLUID REACTION VESSEL, METHOD FOR MANUFACTURING THE SAME, AND MICRO-FLUID REACTION METHOD USING THE VESSEL

(75) Inventors: Su-hyeon Kim, Yongin-si (KR); Jin-tae Kim, Yongin-si (KR); Kak Namkoong, Yongin-si (KR); In-ho Lee, Yongin-si (KR); Chin-sung Park, Yongin-si (KR); Young-sun Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 631 days.

(21) Appl. No.: 11/625,877

(22) Filed: Jan. 23, 2007

(65) Prior Publication Data

US 2007/0254379 A1    Nov. 1, 2007

(30) Foreign Application Priority Data

Apr. 28, 2006    (KR) .................... 10-2006-0038879

(51) Int. Cl.
| | |
|---|---|
| *G01N 15/06* | (2006.01) |
| *G01N 33/00* | (2006.01) |
| *G01N 33/48* | (2006.01) |
| *B01J 10/00* | (2006.01) |
| *B01J 10/02* | (2006.01) |
| *B01J 12/00* | (2006.01) |
| *B01J 12/02* | (2006.01) |
| *F15C 1/04* | (2006.01) |
| *F15C 3/00* | (2006.01) |
| *F15C 1/06* | (2006.01) |

(52) U.S. Cl. .................... 422/68.1; 422/129; 137/825; 137/829; 137/833

(58) Field of Classification Search ................. 422/129, 422/130, 68.1; 137/825, 829, 833
See application file for complete search history.

(56) References Cited

U.S. PATENT DOCUMENTS 6,737,026 B1 *    5/2004    Bergh et al. .................. 422/130

(Continued)

FOREIGN PATENT DOCUMENTS

KR    1020030009857    2/2003

OTHER PUBLICATIONS

Byung-Ho Jo et al. Three-Dimensional Micro-Channel Fabrication in Polydimethylsiloxane (PDMS) Elastomer. Journal of Microelectromechancial Systems, vol. 9, No. 1. Mar. 2000. p. 76-81.*
Korean Office Action; 013239708; Sep. 5, 2007. All references cited in the Office action and not previously submitted are listed above.

*Primary Examiner*—Karl E Group
*Assistant Examiner*—Noah S Wiese
(74) *Attorney, Agent, or Firm*—Cantor Colburn LLP

(57) ABSTRACT

A micro-fluid reaction vessel includes an upper plate formed of an elastomer, a lower plate adhered to the upper plate, a micro-chamber and a micro-channel formed on an inner surface of the upper plate facing the lower plate and an inlet hole and an outlet hole formed in the upper plate and through which a fluid flows into or out of, respectively. The micro-channel is constructed to be closed by pressure applied to the upper plate and elastically restored when the pressure is not applied. A micro fluid reaction method uses the micro fluid reaction vessel and a method of manufacturing forms the microfluid reaction vessel.

7 Claims, 6 Drawing Sheets

U.S. PATENT DOCUMENTS

| | | | |
|---|---|---|---|
| 2002/0029814 A1* | 3/2002 | Unger et al. | 137/824 |
| 2002/0037499 A1* | 3/2002 | Quake et al. | 435/5 |
| 2002/0182627 A1* | 12/2002 | Wang et al. | 435/6 |
| 2003/0025129 A1* | 2/2003 | Hahn et al. | 257/200 |
| 2008/0163946 A1* | 7/2008 | Gomez et al. | 137/843 |

* cited by examiner

MICRO-FLUID REACTION VESSEL, METHOD FOR MANUFACTURING THE SAME, AND MICRO-FLUID REACTION METHOD USING THE VESSEL

This application claims priority to Korean Patent Application No. 10-2006-0038879, filed on Apr. 28, 2006, and all the benefits accruing there from under 35 U.S.C §119, the contents of which are herein incorporated by reference in its entirety.

BACKGROUND OF THE INVENTION

1. Field of the Invention

The present invention relates to microfluidics, and more particularly, to a micro-fluid reaction vessel in which the reaction of a micro-fluid occurs, a method for manufacturing the micro-fluid reaction vessel, and a micro-fluid reaction method using the micro-fluid reaction vessel.

2. Description of the Related Art

A micro-fluid reaction vessel is a vessel in which a small amount of fluid is accommodated, a biochemical reaction such as polymerase chain reaction ("PCR") occurs in the fluid and biochemical properties such as gene revelation appearance, gene defects, and protein distribution included in the fluid are analyzed.

FIG. 1 is a cross-sectional view of a conventional micro-fluid reaction vessel of the prior art. Referring to FIG. 1, the micro-fluid reaction vessel 10 includes an upper plate 15 formed of glass and a lower plate 11 bonded to the upper plate 15 and formed of silicon. A micro-chamber and micro-channel 12 is formed on the lower plate 11 so that a fluid F can be accommodated therein. An inlet hole 16 through which the fluid F flows into the micro-chamber and micro-channel 12 and an outlet hole 17 through which the fluid F flows to outside the micro-fluid reaction vessel 10 are formed in the upper plate 15.

When a micro-fluid reaction such as PCR is performed using the micro-fluid reaction vessel 10, there are inconveniences such that the inlet hole 16 and the outlet hole 17 should be closed using a tape 20 so as to prevent evaporation of the fluid F during the micro-fluid reaction and that the tape 20 should be pressurized by a pressurizing member 25 formed of rubber so as to prevent separation of the tape 20 from the upper plate 15. An additional problem is that, due to costs of the upper plate 15 formed of glass and the etching costs of the lower plate 11 formed of silicon, the manufacturing costs of the micro-fluid reaction chamber 10 increase.

SUMMARY OF THE INVENTION

An exemplary embodiment provides a micro-fluid reaction vessel having an improved structure in which a micro-channel is closable and elastically restorable, a method for manufacturing the micro-fluid reaction vessel and a micro-fluid reaction method using the micro-fluid reaction vessel.

In an exemplary embodiment, there is provided a micro-fluid reaction vessel including an upper plate formed of an elastomer, a lower plate adhered to the upper plate, a micro-chamber and a micro-channel formed on an inner surface of the upper plate facing the lower plate and an inlet hole and an outlet hole formed in the upper plate and through which a fluid flows into or out. The micro-channel is closable by pressure applied to the upper plate and elastically restorable when the pressure is removed.

In an exemplary embodiment, the upper plate may be formed of polydimethylsiloxane ("PDMS").

In an exemplary embodiment, the upper plate may be a transparent plate in which a biochemical reaction of the fluid accommodated in the micro-chamber can be analyzed by fluorescence detection.

In an exemplary embodiment, the lower plate may be formed of silicon.

In an exemplary embodiment, a cross-section of the micro-channel may be trapezoidal or a partially closed curve shape in which an upper boundary of the micro-channel is curved.

In an exemplary embodiment, the micro-fluid reaction vessel may further include a clamping member closing the micro-channel by pressuring the upper plate.

In an exemplary embodiment, there is provided a method for manufacturing a micro-fluid reaction vessel. The method includes forming an upper-plate mold in which a protrusion corresponding to a micro-chamber and a micro-channel is formed, forming an upper plate on which the micro-chamber and the micro-channel are formed, the forming an upper plate including injecting a mixed solution of resin of an elastomer and a curing agent into the upper-plate mold, curing the upper plate and separating the cured upper plate from the upper-plate mold, forming an inlet hole and an outlet hole in the upper plate and adhering a lower plate to a bottom surface of the upper plate.

In an exemplary embodiment, the forming an upper-plate mold may include injecting an elastomer into an upper-plate prototype having the same shape as the upper plate, curing the upper plate mold and separating the cured upper plate mold from the upper-plate prototype.

In an exemplary embodiment, the forming an upper plate mold may include forming a groove corresponding to the protrusion of the upper-plate mold in the upper-plate prototype by etching using photolithography.

In an exemplary embodiment, the forming a groove may include wet etching.

In an exemplary embodiment, the upper plate may be formed of polydimethylsiloxane ("PDMS").

In an exemplary embodiment, the upper plate may be a transparent plate in which a biochemical reaction of the fluid accommodated in the micro-chamber can be analyzed by fluorescence detection.

In an exemplary embodiment, the lower plate may be formed of silicon.

In an exemplary embodiment, the adhering a lower plate to the upper plate may include activating at least one of an adhering surface of the upper plate and the lower plate, the activating including projecting plasma particles onto the adhering surface and contacting the upper plate and the lower plate each other.

In an exemplary embodiment, the forming an inlet hole and the outlet hole may include punching.

In an exemplary embodiment, there is provided a micro-fluid reaction method. The method includes injecting a fluid into a micro-chamber and a micro-channel through an inlet hole of a micro-fluid reaction vessel, closing the micro-channel by pressurizing the upper plate, the micro-channel being elastically restored when the upper plate is not pressurized, and inducing a biochemical-reaction of the fluid injected into the micro-chamber by creating an environment suitable for the biochemical reaction. The micro-fluid reaction vessel includes the upper plate formed of an elastomer, a lower plate adhered to the upper plate, the micro-chamber and the micro-channel formed on an inner surface of the upper plate facing to the lower plate, and the inlet hole and the outlet hole formed in the upper plate and through which a fluid flows into or out of, respectively.

The micro-fluid reaction method may further include analyzing the biochemical reaction that occurs in the microchamber by fluorescence detection.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
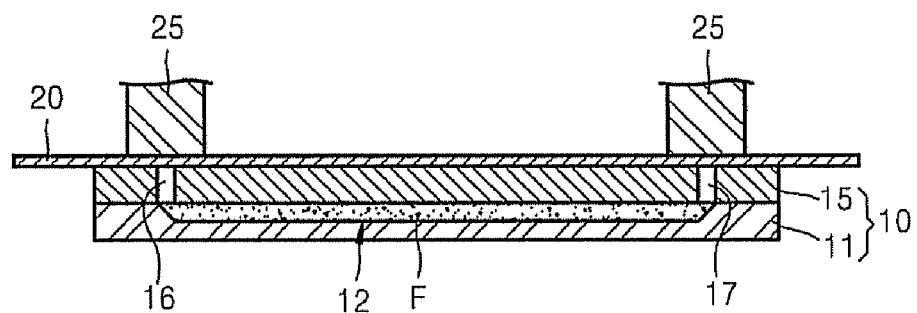
FIG. 1 is a cross-sectional view of a conventional micro-fluid reaction vessel of the prior art.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The present invention will now be described more fully with reference to the accompanying drawings, in which exemplary embodiments of the invention are shown.

Figure 2:
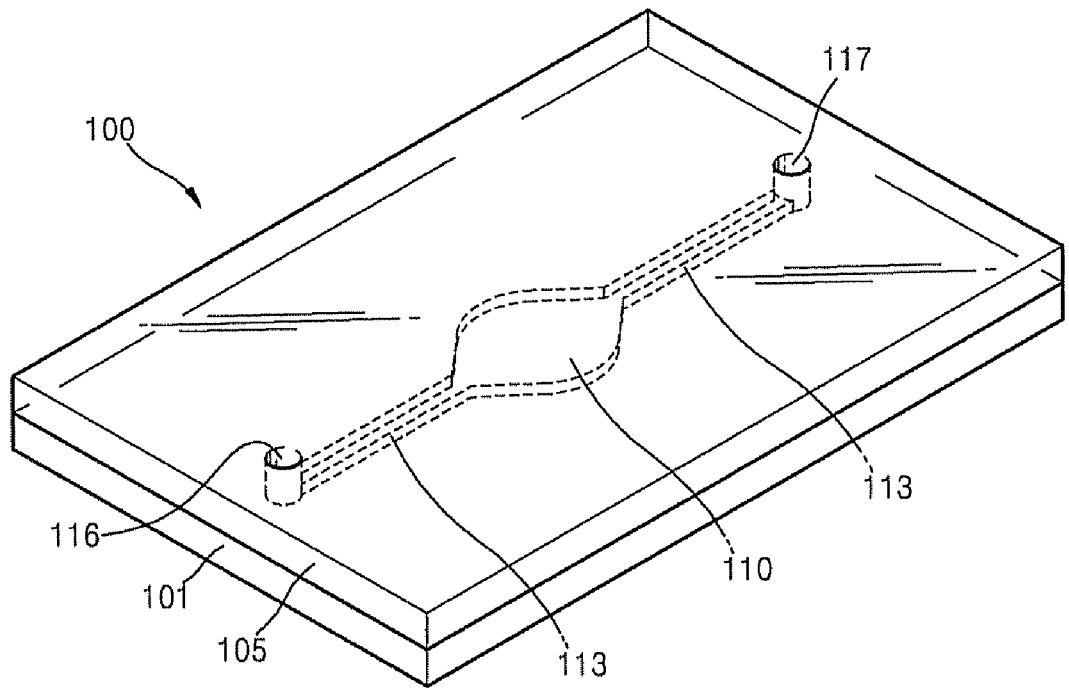
FIGS. 2 and 3 are respectively a perspective view and a cross-sectional view of an exemplary embodiment of a micro-fluid reaction vessel according to the present invention.
Figure 3:
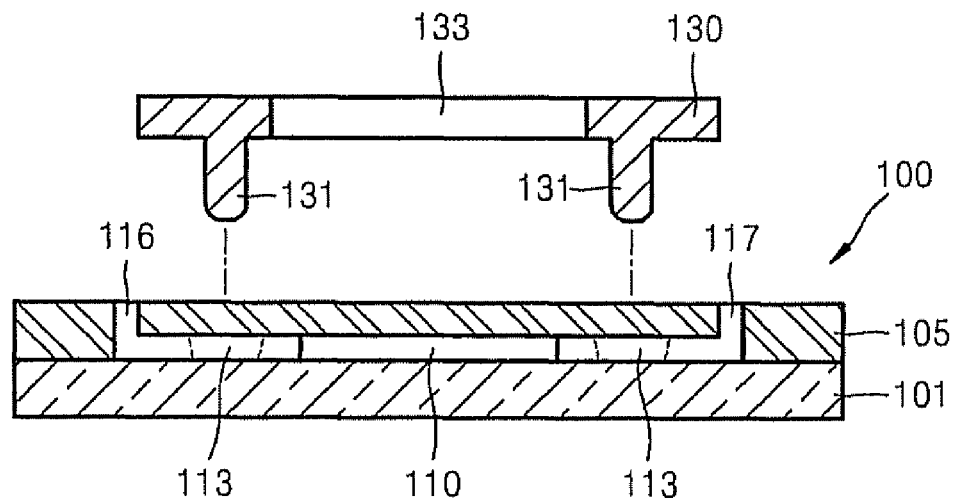
Figure 4:
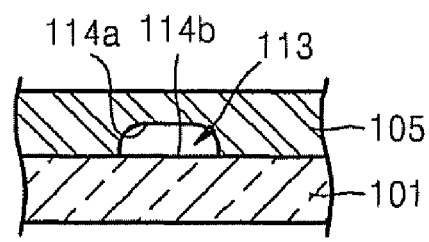
FIGS. 4 and 5 are cross-sectional views of alternative exemplary embodiments of the micro-channel of FIG. 2.
Figure 5:
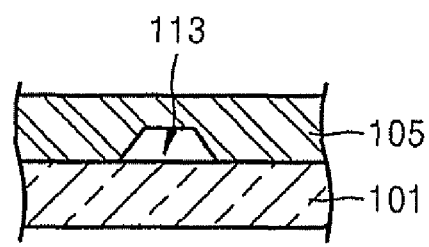

FIGS. 2 and 3 are respectively a perspective view and a cross-sectional view of an exemplary embodiment of a micro-fluid reaction vessel according to the present invention, and FIGS. 4 and 5 illustrate alternative exemplary embodiments of a cross-section of the micro-channel of FIG. 2.

Referring to FIGS. 2 and 3, a micro-fluid reaction vessel 100 includes an upper plate 105 and a lower plate 101, which are adhered to each other. The upper plate 105 may be formed of an elastomer, such as polydimethylsiloxane ("PDMS"). The lower plate 101 may be formed of silicon having excellent thermal conductivity properties compared to a polymer or a glass.

An inlet hole 116 through which a fluid flows into the micro-fluid reaction vessel 100 and an outlet hole 117 through which the fluid flows out from the micro-fluid reaction vessel 100 are formed in the upper plate 105. A micro-chamber 110 and a micro-channel 113 are formed on an inner surface of the upper plate 105 that is opposite to (e.g., facing) the lower plate 101. A biochemical reaction of the fluid occurs in the micro-chamber 110. The microchamber 110 is disposed approximately in a center of the upper plate 105 between the inlet hole 116 and the outlet hole 117. The micro-channel 113 connects the micro-chamber 110 and the inlet hole 116 and the micro-chamber 110 and the outlet hole 117, respectively, to provide a path in which the fluid flows.

The micro-channel 113 may be closed by pressure applied to the upper plate 105 formed of an elastomer, as shown as an imaginary line (e.g., dotted lines in the micro-channel 113) of FIG. 3. The micro-channel 113 is elastically restored when the pressure is removed.

A clamping member 130 may be used to apply pressure to the upper plate 105. When the clamping member 130 is pressurized downwards, a pair of pushers 131 of the clamping member 130 closes the micro-channel 113 and the micro-chamber 110 is sealed. The flexible upper plate 105 is deflected in to the microchannel 113 by the pushers 131 and forms an obstruction in the microchannel 113, thereby closing the micro-channel 113. Since the clamping member 130 applies pressure to the flexible upper plate 105, the clamping member 130 may be formed of a solid material (e.g., inflexible or resistant to deformation) such as plastics or metals.

In an exemplary embodiment, the micro-fluid reaction vessel 100 may include the upper plate 105 and the lower plate 101, excluding the clamping member 130. In an alternative exemplary embodiment, the micro-fluid reaction vessel 100 may have a cartridge shape by including the upper plate 105, the lower plate 101, and the clamping member 130 together, such as in a single unit.

Reference numeral 133 of FIG. 3 denotes a light transmission hole for fluorescence-detecting a reaction occurring in the micro-chamber 110. Alternatively, the upper plate 105 may be sufficiently transparent to fluorescence-detect the reaction in the micro-chamber 110, and the light transmission hole 133 may be omitted.

Referring to FIGS. 4 and 5, the micro-channel 113 may have a partially closed curve shaped cross-section in which an upper boundary 114a has an upside down U-like curve cross-section. A lower boundary 14b disposed on the lower plate 101 may have a substantially straight cross-section, as shown in FIG. 4. The upper boundary 114a may be formed during processing of the upper plate 105. The micro-channel 113 may have a trapezoidal cross-section, as shown in FIG. 5. The partially closed curve (FIG. 4) or trapezoidal cross-section (FIG. 5) helps the micro-channel 113 to be closed without leakage when pressurizing the upper plate 105 using the clamping member 130. Therefore, a malfunction of the closure of the micro-channel 113 is reduced, or effectively prevented.

FIGS. 6A through 6F are cross-sectional views sequentially illustrating an exemplary embodiment of a method for manufacturing the micro-fluid reaction vessel 100 of FIG. 2.

Figure 6A:
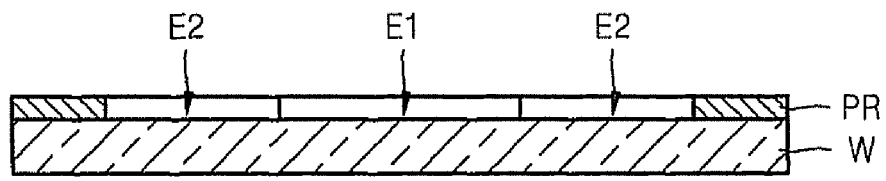
FIGS. 6A through 6F are cross-sectional views sequentially illustrating an exemplary embodiment of a method for manufacturing the micro-fluid reaction vessel of FIG. 2.
Figure 6B:
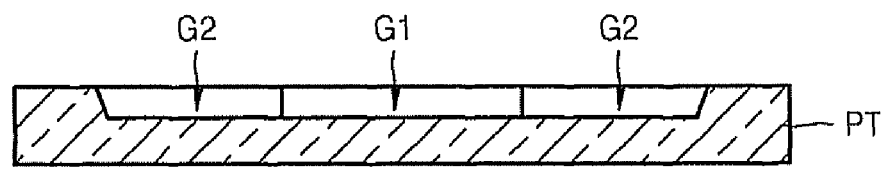
Figure 6C:
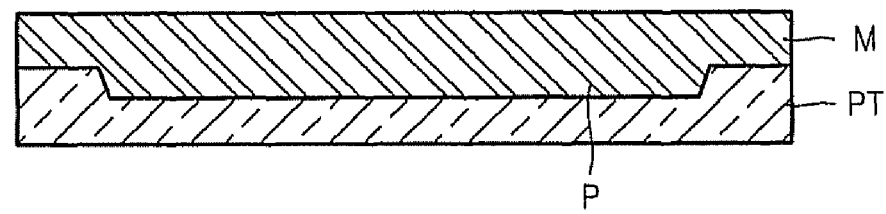
Figure 6D:
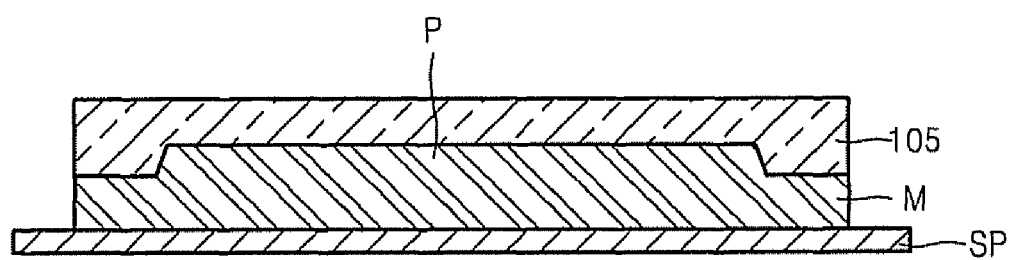
Figure 6E:
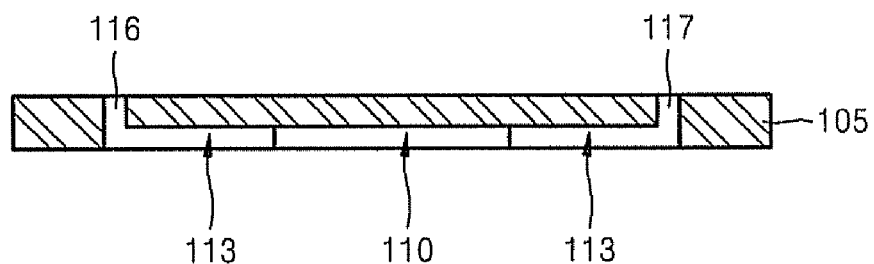
Figure 6F:
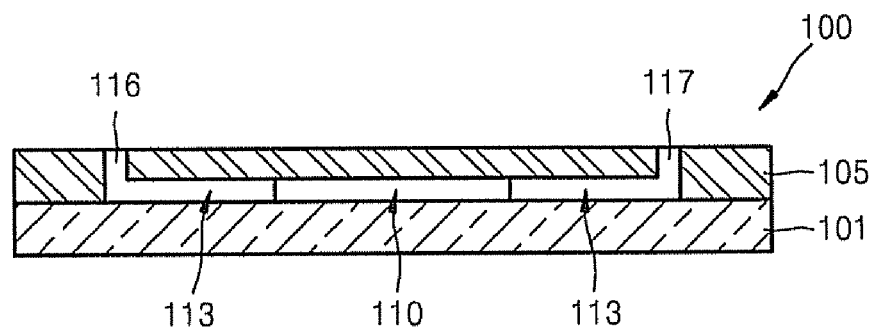

Referring to FIGS. 6A through 6F, the method for manufacturing the micro-fluid reaction vessel (see 100 of FIG. 6F) includes manufacturing an upper-plate prototype ("PT") (see FIGS. 6A and 6B), manufacturing an upper-plate mold ("M") (see FIG. 6C), manufacturing the upper plate 105 (see FIGS. 6D and 6E), and adhering the upper plate 105 and the lower plate 101 (see FIG. 6F). The upper-plate prototype PT has substantially the same shape as the upper plate 105 and includes a first groove G1 corresponding to the micro-chamber 110 and a second groove G2 corresponding to the micro-channel 113.

Referring to FIGS. 6A and 6B, photoresist ("PR") coating, photo exposure, and development are sequentially performed on the top surface of a wafer substrate W by photolithography. The substrate may be formed of glass. Portions E1 and E2 of the upper surface of the wafer W are exposed and the exposed portions E1 and E2 are etched, forming the first and second grooves G1 and G2, respectively. The PR is removed, thereby manufacturing the upper-plate prototype PT.

Among etching methods, wet etching is a method by which an exposed portion is essentially melted using chemicals and is characterized by isotropy etched without a predetermined directivity. In comparison to wet etching, dry etching is a method by which a material of an exposed portion is detached by accelerating ions and is characterized by anisotropy etched in a predetermined direction.

In the illustrated exemplary embodiment, the first and second grooves G1 and G2 are etched and formed by wet etching characterized by isotropy so that the micro-channel (see 113 of FIGS. 4 and 5) having the partially closed curve shape or trapezoidal cross-section can be formed on the upper plate 105. In an exemplary embodiment, in order to improve the precision of etching by supplementing the PR, before PR coating, a process of depositing polysilicon on the wafer W and a process of etching the deposited metal or polysilicon layer may be added.

Referring to FIG. 6C, the upper-plate mold M is formed by injecting an elastomer into the upper-plate prototype PT, curing the upper-plate mold M and then separating the upper-plate prototype PT from the cured upper-plate mold M. In exemplary embodiments, a hydrophobic coating layer may be formed on the surface of the upper-plate prototype PT into which the elastomer will be injected, before injecting the elastomer, so that the upper-plate prototype PT and the cured upper-plate mold M can be relatively easily separated from each other. In one exemplary embodiment, a liquid coating agent, such as Sigmacoat®, or vapor deposition coating, such as parylene, may be used to form the hydrophobic coating layer. A protrusion P corresponding to the grooves G1 and G2 of the upper-plate prototype PT is formed in the upper-plate mold M formed by elastomer molding.

Referring to FIGS. 6D and 6E, the upper plate 105 is formed by injecting a mixed solution of resin including an elastomer and a curing agent into the upper-plate mold M, curing the upper plate 105 and then separating the upper plate 105 from the upper-plate mold M. In an exemplary embodiment, as the elastomer, polydimethylsiloxane ("PDMS") may be employed.

In exemplary embodiments, the upper plate 105 may be transparent to fluorescence-detect a reaction in the micro-chamber 110. The upper-plate mold M is supported by a support plate SP during molding of the upper plate 105 so as to reinforce a solidity of the upper-plate mold M. The support plate SP may include a glass wafer.

In exemplary embodiments, a hydrophobic coating layer may be formed on the surface of the upper-plate mold M into which the elastomer will be injected, before injecting the elastomer, so that the upper-plate mold M and the cured upper-plate 105 can be relatively easily separated from each other. In one exemplary embodiment, a liquid coating agent, such as Sigmacoat®, or vapor deposition coating, such as parylene, may be used to form the hydrophobic coating layer.

Referring to FIG. 6E, a micro-chamber 110 and a micro-channel 113 are formed on the upper plate 105 corresponding to the protrusion P of the upper-plate mold M. An inlet hole 116 and an outlet hole 117 are formed by removing material, such as by punching the upper plate 105 that has been separated from the upper-plate mold M.

Referring to FIG. 6F, the upper plate 105 and the lower plate 101 are adhered to each other, thereby forming a micro-fluid reaction vessel 100. An upper surface of the lower plate 101 is combined with a lower surface (e.g., where the micro-chamber 110 and microchannel 113 are formed) of the upper plate 105. The lower plate 101 may be formed of silicon. In an exemplary embodiment, oxygen plasma particles are projected onto at least one of the upper plate 105 and the lower plate 101 surfaces to be adhered together, thereby activating the adhered surface. The upper plate 105 and the lower plate 101 contact each other when they are combined, thereby adhering the upper plate 105 and the lower plate 101.

Figure 7A:
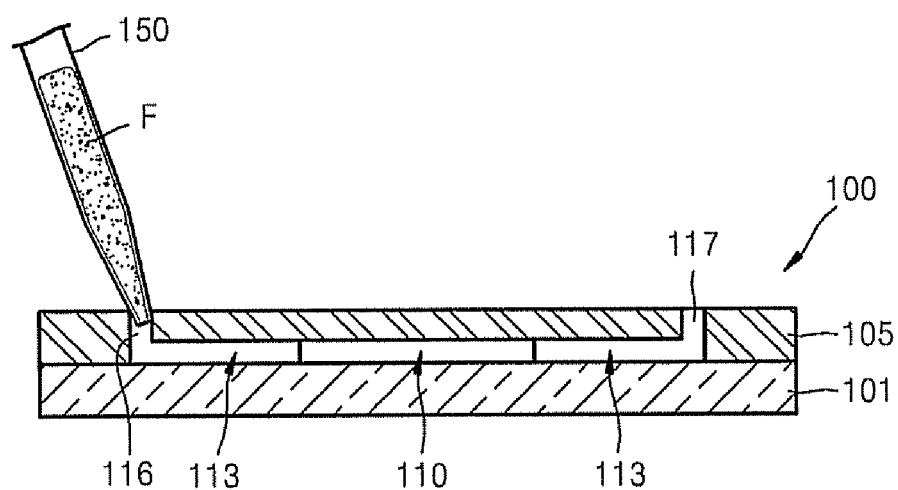
FIGS. 7A through 7C are cross-sectional views sequentially illustrating an exemplary embodiment of a micro-fluid reaction method using the micro-fluid reaction vessel of FIG. 2.
Figure 7B:
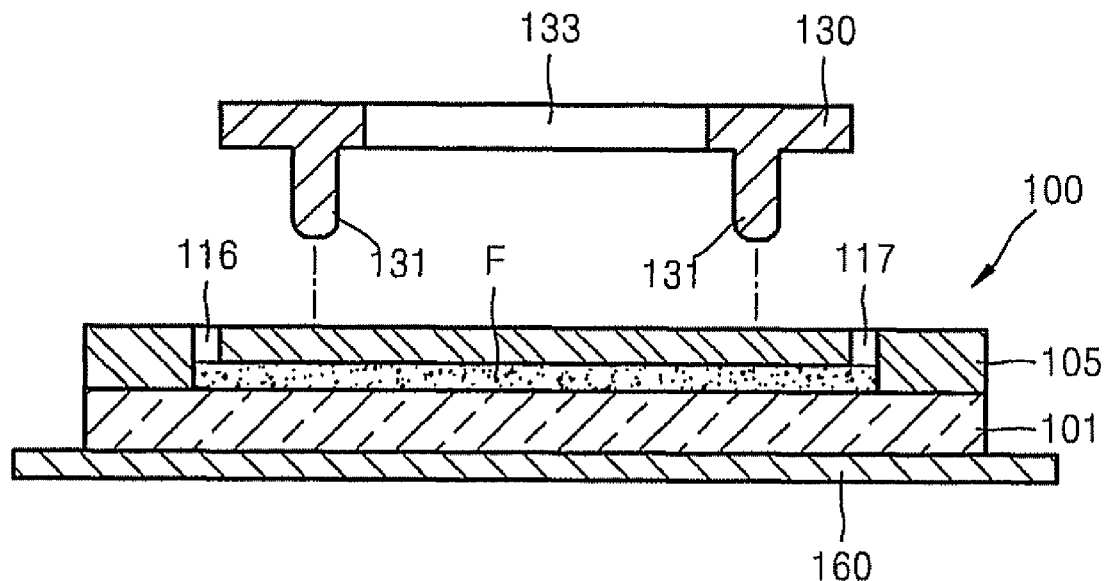
Figure 7C:
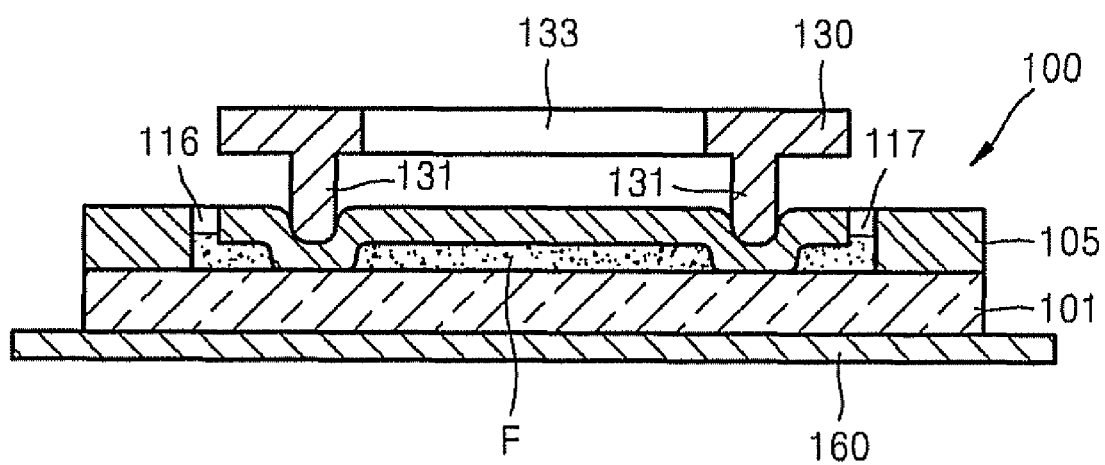

FIGS. 7A through 7C are cross-sectional views sequentially illustrating an exemplary embodiment of a micro-fluid reaction method using the micro-fluid reaction vessel of FIG. 2. Referring to FIG. 7A, the micro-fluid reaction method includes injecting a fluid F into a micro-chamber 110 and a micro-channel 113 through an inlet hole 116 of a micro-fluid reaction vessel 100. A tool such as pipette 150 may be used to inject the fluid F.

Referring to FIG. 7B, the micro-fluid reaction method includes disposing the micro-fluid reaction vessel 100, into which the fluid F has been injected, on a heating element 160, such as a micro-heater, and disposing a clamping member 130 on the micro-fluid reaction vessel 100.

Referring to FIG. 7C, the micro-fluid reaction method includes closing the micro-channel (see 113 of FIG. 7A) so that the micro-channel by pressurizing the upper plate 105 using a pusher 131 of the clamping member 130. By applying pressure to the upper plate 105, the pusher 131 deforms the flexible upper plate 105 and provides an obstruction in the microchannel 113, thereby isolating the microchamber 110 containing the fluid F. The pressure may be applied by manual, automatic and/or mechanical method.

A biochemical reaction of the fluid F is induced by creating an environment suitable for the biochemical reaction, such as by operating the heating element 160. Since the micro-channel 113 is closed, evaporation of the fluid F accommodated in the micro-chamber (see 110 of FIG. 7A) is suppressed during the biochemical reaction. As such, a stable biochemical reaction is possible within the micro-chamber 110 and the reliability of reaction analysis is improved.

In an exemplary embodiment, the micro-fluid reaction method of the illustrated embodiment may further include analyzing the biochemical reaction, such as by detecting a fluorescence signal emitted from the fluid F during the biochemical reaction. A method of analyzing the biochemical reaction by detecting the fluorescence signal may also be referred to as 'fluorescence detection'.

Fluorescence detection used in analyzing a polymerase chain reaction ("PCR") includes a variety of methods. Methods of analyzing a polymerase chain reaction include, but are not limited to, using a dye, such as fluorescent SYBR Green I, and binding the dye to double stranded DNA generated by the PCR. Methods may also include using a phenomenon in which fluorescence is generated when a DNA sequence is used as a probe and bonding between fluorophore at both ends of the probe and a quencher is cut.

In order to demonstrate whether the above-described micro-fluid reaction vessel (see 100 of FIG. 3) can be used in a biochemical reaction such as PCR, the inventors performed PCR using an exemplary embodiment of a micro-fluid reaction vessel 100 and analyzed the result of reaction by fluorescence detection. The result of the analysis is shown in FIGS. 8 and 9.

Figure 8:
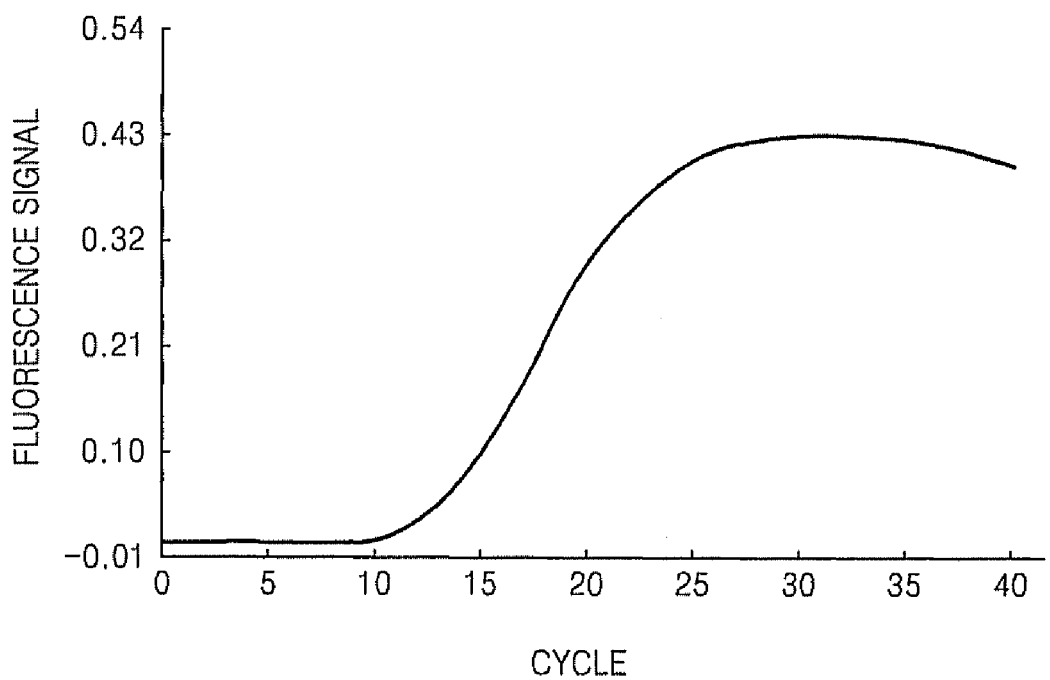
FIG. 8 is a graph illustrating a result in which a deoxyribonucleic acid ("DNA") amplification reaction occurred in the micro-fluid reaction vessel of FIG. 2 and is analyzed by fluorescence detection.

FIG. 8 is a graph illustrating the result of analyzing DNA amplification caused by PCR through fluorescence detection. In the graph of FIG. 8, a traditional S-shaped curve is shown in the PCR.

Figure 9:
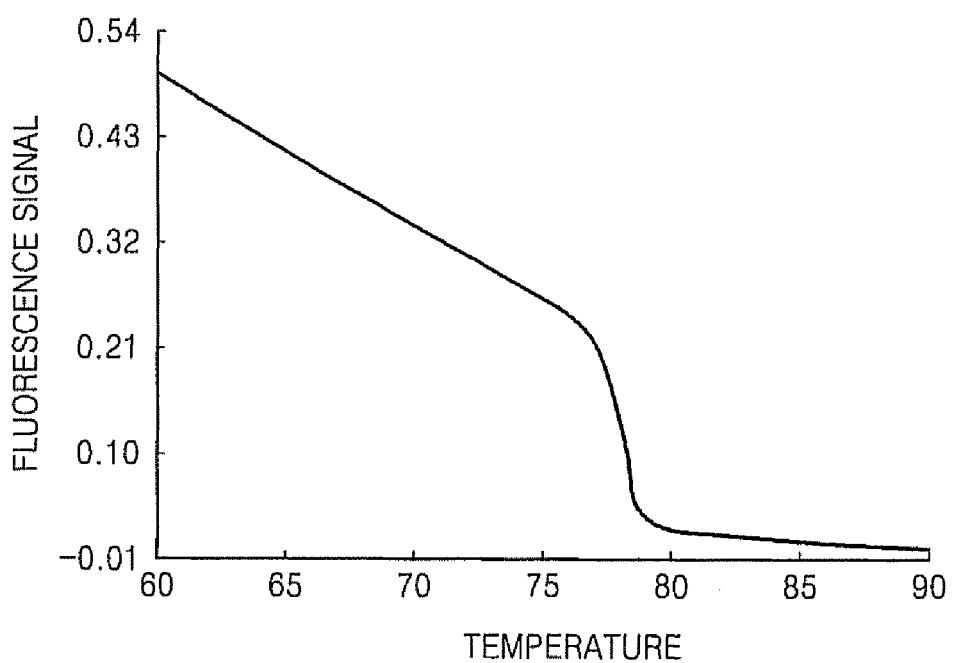
FIG. 9 is a graph illustrating the result in which DNA melting caused by a temperature rise occurred in the micro-fluid reaction vessel of FIG. 2 and is analyzed by fluorescence detection.

In addition, FIG. 9 is a graph illustrating the exemplary results of analyzing the case where DNA is melted by heating DNA amplified by PCR, through fluorescence detection. In the graph of FIG. 9, a traditional curve is shown during DNA melting. Through experiments carried out by the inventors, it is ascertained that the micro-fluid reaction vessel 100 of the illustrated embodiments can be used in the biochemical reaction.

As in the illustrated embodiments, of the micro-fluid reaction vessel and the micro-fluid reaction method using the same, a micro-fluid reaction process can be conveniently performed without the necessity of closing an inlet hole and an outlet hole.

In addition, in the illustrated embodiments of the micro-fluid reaction vessel and the method for manufacturing the same, etching is not needed on a lower plate. A plurality of upper plates having substantially the same shape can be produced with low costs by elastomer molding. Advantageously, costs for manufacturing the micro-fluid reaction vessel are reduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A micro-fluid reaction vessel comprising:
    an upper plate formed of an elastomer;
    a lower plate adhered to the upper plate;
    a micro-chamber and a micro-channel formed on an inner surface of the upper plate facing the lower plate, wherein the micro-channel is closable by pressure applied to the upper plate and elastically restored when the pressure is removed; an inlet hole and an outlet hole formed in the upper plate and through which a fluid flows into or out of, respectively, and a clamping member which closes the micro-channel by pressuring the upper plate, the clamping member being separable from the upper plate, wherein the clamping member comprises a pair of pushers closing the micro-channel and sealing the micro-chamber.

2. The micro-fluid reaction vessel of claim 1, wherein the upper plate is formed of polydimethylsiloxane ("PDMS").

3. The micro-fluid reaction vessel of claim 1, wherein the upper plate is a transparent plate such that a biochemical reaction of the fluid accommodated in the micro-chamber can be analyzed by fluorescence detection.

4. The micro-fluid reaction vessel of claim 1, wherein the lower plate is formed of silicon.

5. The micro-fluid reaction vessel of claim 1, wherein a cross-section of the micro-channel is trapezoidal.

6. The micro-fluid reaction vessel of claim 1, wherein a cross-section of the micro-channel is a partially closed curve shape in which an upper boundary of the micro-channel is curved.

7. The micro-fluid reaction vessel of claim 1, wherein the clamping member comprises a light transmission hole for fluorescence-detecting a reaction occurring in the micro-chamber.

* * * * *